(12) United States Patent
Ikarashi et al.

(10) Patent No.: US 11,329,808 B2
(45) Date of Patent: May 10, 2022

(54) SECURE COMPUTATION DEVICE, SECURE COMPUTATION AUTHENTICATION SYSTEM, SECURE COMPUTATION METHOD, AND PROGRAM

(71) Applicant: NIPPON TELEGRAPH AND TELEPHONE CORPORATION, Chiyoda-ku (JP)

(72) Inventors: Dai Ikarashi, Musashino (JP); Gembu Morohashi, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 92 days.

(21) Appl. No.: 16/970,552

(22) PCT Filed: Feb. 14, 2019

(86) PCT No.: PCT/JP2019/005351
§ 371 (c)(1),
(2) Date: Aug. 17, 2020

(87) PCT Pub. No.: WO2019/163636
PCT Pub. Date: Aug. 29, 2019

(65) Prior Publication Data
US 2021/0028926 A1    Jan. 28, 2021

(30) Foreign Application Priority Data

Feb. 20, 2018 (JP) .............................. JP2018-027999

(51) Int. Cl.
*H04L 9/08*    (2006.01)
*H04L 9/32*    (2006.01)

(52) U.S. Cl.
CPC ............ *H04L 9/085* (2013.01); *H04L 9/0869* (2013.01); *H04L 9/32* (2013.01); *H04L 2209/12* (2013.01)

(58) Field of Classification Search
CPC ......... H04L 9/085; H04L 9/0869; H04L 9/32; H04L 9/3226; H04L 2209/12; H04L 2209/46
See application file for complete search history.

(56) References Cited

PUBLICATIONS

Kikuchi, Ryo, et al. "Password-based authentication protocol for secret-sharing-based multiparty computation." IEICE Transactions on Fundamentals of Electronics, Communications and Computer Sciences 101.1 (2018): 51-63. [online][retrieved on Dec. 17, 2021]. Retrieved from: https://search.ieice.org/ (Year: 2018).*

(Continued)

*Primary Examiner* — Jung W Kim
*Assistant Examiner* — Sangseok Park
(74) *Attorney, Agent, or Firm* — Oblon, McClelland, Maier & Neustadt, L.L.P.

(57) ABSTRACT

A secure computation device obtains a first concealed verification value $[z]_i=[w-\omega]_i$ with secure computation by using concealed authentication information $[w]_i$ which is preliminarily stored and concealed authentication information $[\omega]_i$ which is inputted, obtains a concealed extension field random number $[r_m]_i \in [F^e]$ which is a secret sharing value of an extension field random number $r_m$, obtains a second concealed verification value $[y_m]_i$ in which $y_m$ is concealed with secure computation by using the first concealed verification value $[z]_i$, and obtains a third concealed verification value $[r_m y_m]_i$ with secure computation by using the concealed extension field random number $[r_m]_i$ and the second concealed verification value $[y_m]_i$ and outputs the third concealed verification value $[r_m y_m]_i$.

9 Claims, 7 Drawing Sheets

(56) References Cited

PUBLICATIONS

Ryo Kikuchi, et al., "Password-Based Authentication Protocol for Secret-Sharing-Based Multiparty Computation" The Institute of Electronics, Information and Communication Engineers Trans. Fundamentals, XP 55849486, vol. E101-A, No. 1, Jan. 2018, pp. 51-63.
International Search Report dated Apr. 9, 2019 in PCT/JP2019/005351 filed Feb. 14, 2019.
I. Damgard et al., "Unconditionally Secure Constant-Rounds Multiparty Computation for Equality, Comparison, Bits and Exponentiation", TCC 2006, pp. 285-304.
D. Ikarashi et al., "Secure Database Operations Using an Improved 3-party Verifiable Secure Function Evaluation", In SCIS 2011, 2011, 9 total pages (with English abstract).
A. Shamir, "How to Share a Secret", Communications of the ACM, Nov. 1979, vol. 22, No. 11, pp. 612-613.

\* cited by examiner

SECURE COMPUTATION DEVICE, SECURE COMPUTATION AUTHENTICATION SYSTEM, SECURE COMPUTATION METHOD, AND PROGRAM

TECHNICAL FIELD

The present invention relates to a secure computation technique and especially relates to a secure computation authentication technique for performing authentication processing with secure computation.

BACKGROUND ART

Use of a secure computation technique (see Non-patent Literature 1, for example) enables authentication processing to be performed while keeping authentication information (for example, a password) secret. A simple method is a method for computing a concealed verification value $[w-\omega]_i$ corresponding to $w-\omega$ with secure computation by using concealed authentication information $[w]$ of registered authentication information $w$ and concealed authentication information $[\omega]$ of inputted authentication information $\omega$. $w=\omega$ (successful authentication) is established when $w-\omega=0$ and $w\neq\omega$ (failed authentication) is established when $w-\omega\neq0$. Thus, the concealed verification value $[w-\omega]$ represents a concealed value of an authentication result.

PRIOR ART LITERATURE

Non-Patent Literature

Non-patent Literature 1: Ivan Damgard, Matthias Fitzi, Eike Kiltz, Jesper Buus Nielsen, Tomas Toft, "Unconditionally Secure Constant-Rounds Multi-party Computation for Equality, Comparison, Bits and Exponentiation", TCC 2006, pp. 285-304.

SUMMARY OF THE INVENTION

Problems to be Solved by the Invention

However, the above-described method has a problem of low level of security against spoofing. In other words, in the case where an unauthorized concealed verification value, with which 0 is reconstructed even when $w-\omega\neq0$, is computed, authentication is determined to be successful even though $w-\omega\neq0$. Further, authentication information $w$ and $\omega$ are kept secret, so that detecting such an unauthorized concealed verification value is difficult.

An object of the present invention is to provide a technique for performing authentication processing with high level of security against spoofing while keeping authentication information secret.

Means to Solve the Problems

A secure computation device stores concealed authentication information $[w]_i \in [F]^L$ which is a secret sharing value of authentication information $w$; receives input of concealed authentication information $[\omega]_i \in [F]^L$ which is a secret sharing value of authentication information $\omega$; obtains a first concealed verification value $[z]_i = [w-\omega]_i$ with secure computation by using the concealed authentication information $[w]_i$ and the concealed authentication information $[\omega]_i$; obtains a concealed extension field random number $[r_m]_i \in [F^\varepsilon]$ which is a secret sharing value of an extension field random number $r_m$; obtains a second concealed verification value $[y_m]_i$ in which $y_m$ is concealed with secure computation by using the first concealed verification value $[z]_i$; and obtains a third concealed verification value $[r_m y_m]_i$ with secure computation by using the concealed extension field random number $[r_m]_i$ and the second concealed verification value $[y_m]_i$ and outputs the third concealed verification value $[r_m y_m]_i$. Here, L is an integer which is 1 or greater, $\varepsilon$ is an integer which is 2 or greater, F is a finite field, $F^\varepsilon$ is an extension field of the finite field F, an extension degree of the extension field $F^\varepsilon$ is $\varepsilon$, ceil(x) is a minimum integer which is equal to or greater than a real number x, $M=\text{ceil}(L/\varepsilon)$ holds, $j=0, \ldots, L-1$ holds, $m=0, \ldots, M-1$ holds, $z=(z_0, \ldots, z_{L-1})=w-\omega$ holds, $z_j \in F$ holds, $y_m=(z_{\varepsilon m}, \ldots, z_{\varepsilon(m+1)-1})$ holds for $m=0, \ldots, M-1$, and $z_q$ by which $q>L-1$ is established among $q=\varepsilon(M-1), \ldots, \varepsilon M-1$ is 0.

Effects of the Invention

Authentication processing with high level of security against spoofing can be performed while keeping authentication information secret.

DETAILED DESCRIPTION OF THE EMBODIMENTS

Figure 1:
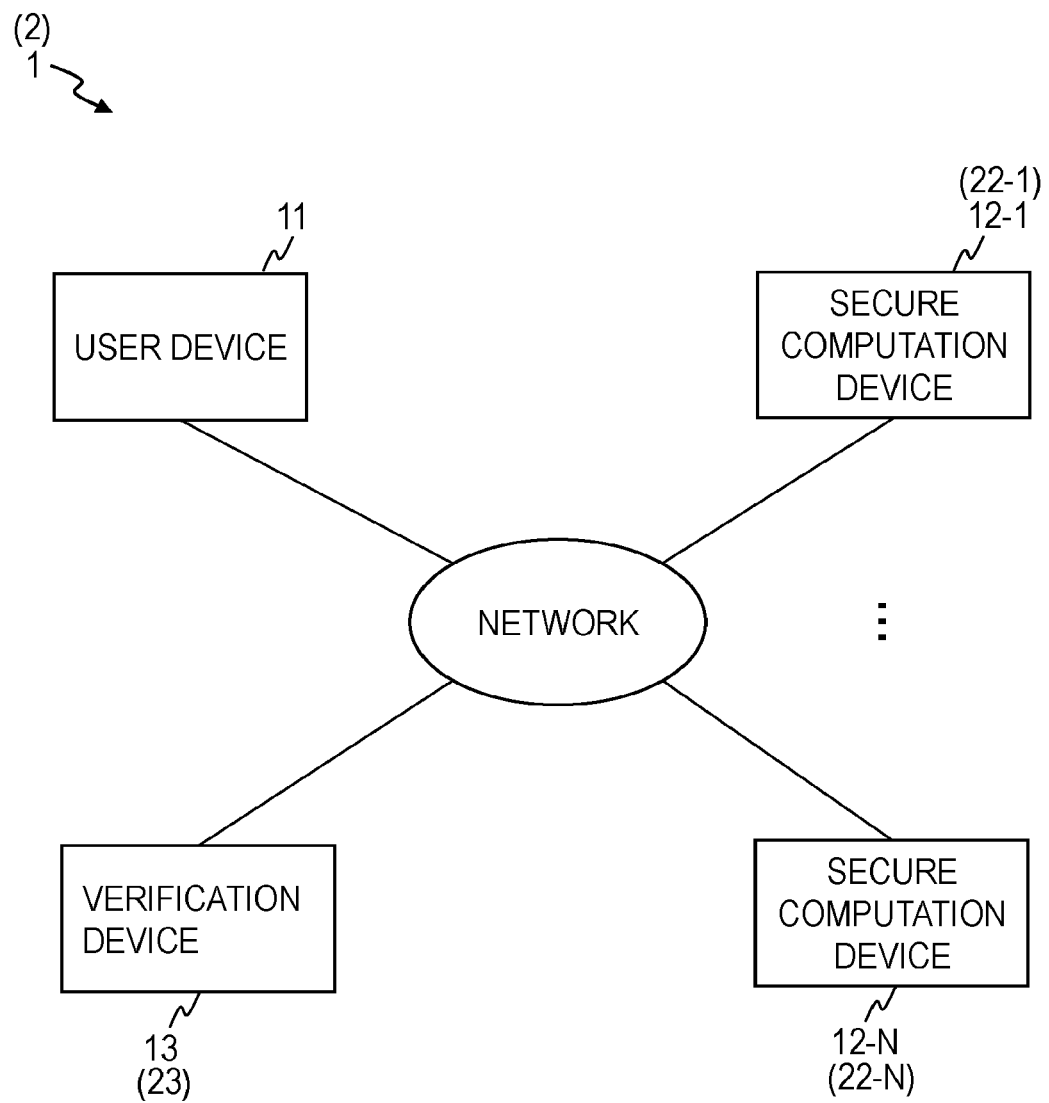
FIG. 1 is a block diagram illustrating the functional configuration of a secure computation authentication system according to embodiments.

Embodiments of the present invention are described below with reference to the accompanying drawings.

[General Outline]

A secure computation authentication system according to the embodiments includes N pieces of (a plurality of pieces of) secure computation devices $P_1, \ldots, P_N$ and a verification device. The verification device may be a device external to the N pieces of secure computation devices $P_1, \ldots, P_N$ or may be a device incorporated in any secure computation device $P_i$. Each secure computation device $P_i$ stores concealed authentication information $[w]_i \in [F]^L$ which is a secret sharing value of authentication information $w$ in a storage. Here, $i=1, \ldots, N$ holds and N is an integer which is 2 or greater. "$\beta_1 \in \beta_2$" represents that $\beta_1$ belongs to $\beta_2$. F denotes a finite field and L denotes an integer which is 1 or greater. The finite field F may be a prime field or may be an extension field. For example, L is an integer which is 2 or greater. [F] denotes a secret sharing value of an element of the finite field F and $[F]^L$ denotes a set composed of L pieces of [F]. $[\alpha]_i$ denotes a secret sharing value of $\alpha$ assigned to the secure computation device $P_i$. Authentication information w is preliminarily registered for a qualified user. Authentication information w is not limited and may be any information such as a password, biometric authentication information, voice authentication information, and pattern authentication information. Each secure computation device $P_i$ may store concealed authentication information $[w]_i$ respectively corresponding to a plurality of pieces of authentication information w or may store only concealed authentication information $[w]_i$ corresponding to a single piece of authentication information w. A secret sharing scheme for obtaining a secret sharing value is not limited and a well-known (K, N) secret sharing scheme (also referred to as a "K-out-of-N threshold secret sharing scheme") such as a replicated secret sharing scheme (see Reference Literature 1, for example) and Shamir's secret sharing scheme (see Reference Literature 2, for example) may be employed. Here, K is an integer which is 2 or greater and satisfies K≥N. For example, K=2 holds. In the (K, N) secret sharing scheme, concealed secret information can be reconstructed if arbitrary K pieces of secret sharing values which are different from each other are provided, but any information of secret information cannot be obtained even if arbitrary K-1 pieces of secret sharing values are provided. Shamir's secret sharing scheme which is the (K, N) secret sharing scheme is referred to as a "(K, N) Shamir's secret sharing scheme" below.

Reference Literature 1: Dai Ikarashi, Koji Chida, Koki Hamada, Katsumi Takahashi, "Secure Database Operations Using An Improved 3-party Verifiable Secure Function Evaluation", In SCIS 2011, 2011.

Reference Literature 2: A. Shamir, "How to Share a Secret", Communications of the ACM, November 1979, Volume 22, Number 11, pp. 612-613.

Concealed authentication information $[\omega]_i \in [F]^L$ which is a secret sharing value of authentication information $\omega$ is inputted into an input unit of each secure computation device $P_i$. An arithmetic unit of each secure computation device $P_i$ obtains a first concealed verification value $[z]_i = [w-\omega]_i$ with secure computation by using the concealed authentication information $[w]_i$ and the concealed authentication information $[\omega]_i$ and outputs the first concealed verification value $[z]_i$. $[w-\omega]_i$ denotes a secret sharing value of w-ω. A secure computation method is not limited and a well-known secure computation method described in Non-patent Literature 1 and Reference Literature 3, for example, may be employed. The same goes for the following secure computation Reference Literature 3: Koji Chida, Koki Hamada, Dai Ikarashi, Katsumi Takahashi, "A Three-party Secure Function Evaluation with Lightweight Verifiability Revisited", In CSS, 2010.

A random number generation unit of each secure computation device $P_i$ obtains and outputs a concealed extension field random number $[r_m]_i \in [F^\varepsilon]$ which is a secret sharing value of an extension field random number $r_m \in F^\varepsilon$. Here, $\varepsilon$ denotes an integer which is 2 or greater, $F^\varepsilon$ denotes an extension field of the finite field F, and an extension degree of the extension field $F^\varepsilon$ is $\varepsilon$. ceil denotes a ceiling function and ceil(x) denotes the minimum integer which is equal to or greater than a real number x. m=0, ..., M-1 holds and M=ceil(L/ε) is satisfied. M denotes an integer which is 1 or greater. For example, M is an integer which is 2 or greater. The concealed extension field random number $[r_m]_i$ has to be generated in a state that the extension field random number $r_m$ is concealed from any secure computation device $P_i$. Such a method is well known and any method may be employed. For example, the secure computation devices $P_1, \ldots, P_N$ can generate the concealed extension field random number $[r_m]_i$ in a coordinated manner. For instance, each secure computation device $P_{i'}$ computes a secret sharing value $[r_{m,i'}]_i \in [F^\varepsilon]$ of an extension field random number $r_{m,i'}$ and sends the secret sharing value $[r_{m,i'}]_i$ to the secure computation device $P_i$ (where i=1, ..., N, i'=1, ..., N, and i'≠i), and each secure computation device $P_i$ obtains $[r_m]_i = [r_{m,1} + \ldots + r_{m,N}]_i$ with secure computation using secret sharing values $[r_{m,1}]_i, \ldots, [r_{m,N}]_i$.

The arithmetic unit of each secure computation device $P_i$ obtains a second concealed verification value $[y_m]_i$ in which $y_m$ is concealed with secure computation using the first concealed verification value $[z]_i$ and outputs the second concealed verification value $[y_m]_i$. Here, $z=(z_0, \ldots, z_{L-1})=w-\omega$, $z_j \in F$, and j=0, ..., L-1 hold, $y_m=(z_{\varepsilon m}, \ldots, z_{\varepsilon(m+1)-1})$ holds for m=0, ..., M-1, and $z_q$ with which q>L-1 is established in q=ε(M-1), ..., εM-1 is 0. $z_q$ with which q>L-1 is established may be expressed as $z_q=0$ (that is, $z_q$ may be padded with 0) or information representing that $z_q$ with which q>L-1 is established is 0 may be added. The arithmetic unit of each secure computation device $P_i$ may obtain each second concealed verification value $[y_m]_i$ by dividing a sequence representing the first concealed verification value $[z]_i$. If there is no $z_q$ with which q>L-1 is established, for example, the arithmetic unit of each secure computation device $P_i$ may divide the first concealed verification value $[z]_i = [y_0]_i | \ldots | [y_{M-1}]_i$ into M pieces so as to obtain $[y_0]_i, \ldots, [y_{M-1}]_i$. Here, $\alpha_1 | \alpha_2$ represents concatenation between $\alpha_1$ and $\alpha_2$. If there is $z_q$ with which q>L-1 is established, the arithmetic unit of each secure computation device $P_i$ may divide the first concealed verification value $[z]_i = [y_0]_i | \ldots | [y_{M-2}]_i | [y'_{M-1}]_i$ into $[y_0]_i, \ldots, [y_{M-2}]_i$, $[y'_{M-1}]_i$ and obtain a secret sharing value $[0, \ldots, 0]_i$ of $z_q=0$ for q>L-1 or a secret sharing value $[0, \ldots, 0]_i$ of information representing that $z_q$ with which q>L-1 is established is 0 so as to establish $[y_{M-1}]_i = [y'_{M-1}]_i | [0, \ldots, 0]_i$.

The second concealed verification value $[y_m]_i$ can be handled as a secret sharing value conforming to the (K, N) Shamir's secret sharing scheme on the extension field $F^\varepsilon$ of the order ε. The case of K=2 is explained. It is assumed that $y_m=(z_{\varepsilon m}, \ldots, z_{\varepsilon(m+1)-1})$ is obtained by expressing an element of the extension field of the order ε by a vector. That is, it is dealt as $y_m=(z_{\varepsilon m}, \ldots, z_{\varepsilon(m+1)-1}) \in F^\varepsilon$. The secret sharing value $[y_m]_i$ obtained by performing secret sharing of $y_m=(z_{\varepsilon m}, \ldots, z_{\varepsilon(m+1)-1}) \in F^\varepsilon$ in accordance with the (2, N) Shamir's secret sharing scheme on the extension field $F^\varepsilon$ of the order ε is expressed as follows.

$$[y_m]_i = y_m + {}_y s_m \cdot I \quad (1)$$
$$= (z_{\varepsilon m} + {}_y s_{m,0} \cdot i, \ldots, z_{\varepsilon(m+1)-1} + {}_y s_{m,\varepsilon-1} \cdot i)$$

This is because a polynomial for obtaining a secret sharing value in accordance with the (2, N) Shamir's secret sharing scheme on the extension field $F^\varepsilon$ of the order ε can be assumed to be $g(\chi) = y_0 + {}_y s_m \cdot \chi \in F^\varepsilon$. Here, ${}_y s_{m,0}, \ldots, {}_y s_{m,\varepsilon-1}$ are respective members on a vector expression ${}_y s_m = ({}_y s_{m,0}, \ldots, {}_y s_{m,\varepsilon-1}) \in F^\varepsilon$ of an extension field random number ${}_y s_m \in F^\varepsilon$, and a vector expression of a coordinate axis $I \in F^\varepsilon$ corresponding to i is $I = (i, 0, \ldots, 0) \in F^\varepsilon$. Coordinate axis $\chi = (\eta, 0, \ldots, 0) \in F^\varepsilon$ holds and η denotes an integer variable. g(I) obtained when $\chi = I = (i, 0, \ldots, 0)$ is $[y_m]_i$ and g(0) obtained when $\chi = 0 = (0, 0, \ldots, 0)$ is $y_m$. As expressed in formula (1), this secret sharing value $[y_m]_i$ is an element of the extension field $F^\varepsilon$ of the order $\varepsilon$. Here, when $y_m \in F^\varepsilon$, $_y s_m \in F^\varepsilon$, and $I \in F^\varepsilon$ are expressed in a polynomial, the following is obtained.

$$y_m = z_{\varepsilon m} + z_{\varepsilon m+1} \cdot X + \ldots + z_{\varepsilon(m+1)-1} \cdot X^{\varepsilon-1}$$

$$_y s_m = s_{m,0} + s_{m,1} \cdot X + \ldots + _y s_{m,\varepsilon-1} \cdot X^{\varepsilon-1}$$

$$I = i + 0 \cdot X + \ldots + _0 \cdot X^{\varepsilon-1}$$

Accordingly, when $y_m + _y s_m \cdot I \in F^\varepsilon$ is expressed in a polynomial, the following is obtained.

$$\begin{aligned} y_m + _y s_m \cdot I &= z_{\varepsilon m} + z_{\varepsilon m+1} \cdot X + \ldots + z_{\varepsilon(m+1)-1} \cdot X^{\varepsilon-1} + \\ &\quad (s_{m,0} + s_{m,1} \cdot X + \ldots + _y s_{m,\varepsilon-1} \cdot X^{\varepsilon-1}) \\ &\quad (i + 0 \cdot X + \ldots + _0 \cdot X^{\varepsilon-1}) \\ &= z_{\varepsilon m} + z_{\varepsilon m+1} \cdot X + \ldots + z_{\varepsilon(m+1)-1} \cdot X^{\varepsilon-1} + \\ &\quad s_{m,0} \cdot I + s_{m,1} \cdot I \cdot X + \ldots + _y s_{m,\varepsilon-1} \cdot I \cdot X^{\varepsilon-1} \\ &= z_{\varepsilon m} + s_{m,0} \cdot I + (z_{\varepsilon m+1} + s_{m,1} \cdot I) \cdot X + \ldots + \\ &\quad (z_{\varepsilon(m+1)-1} + _y s_{m,\varepsilon-1} \cdot I) \cdot X^{\varepsilon-1} \end{aligned} \quad (2)$$

Here, X satisfies $\rho(X) = 0$ for an irreducible polynomial $\rho(X)$ on the finite field F. Vectors whose members are respective coefficients of formula (2) are $(z_{\varepsilon m} + _y s_{m,0} \cdot i, \ldots, z_{\varepsilon(m+1)-1} + _y s_{m,\varepsilon-1} \cdot i)$. This shows that formula (1) is obtained when $y_m + _y s_m \cdot I \in F^\varepsilon$ is expressed in a vector.

A simple example is described in which $L=2$, $\varepsilon=2$, $K=2$, and $N=3$ hold and the finite field F is a prime field GF(5) of an order 5. When secret sharing of $z_0=0$ and $z_1=0$ is performed by a (2, 3) Shamir's secret sharing scheme on the prime field GF(5), examples of a $z_0$ secret sharing value and a $z_1$ secret sharing value corresponding to the secure computation device $P_i$ are respectively $f_0(i) = z_0 + 2i \mod 5$ and $f_1(i) = z_1 + i \mod 5$. Here, $M = \text{ceil}(2/2) = 1$ holds and the second concealed verification value $[y_0]_i = [(z_0, z_1)]_i$ is expressed as $[y_0]_i = [(z_0 + 2i \mod 5, z_1 + i \mod 5)]_i$. That is, $[y_0]_1 = [(2, 1)]_1$, $[y_0]_2 = [(4, 2)]_2$, and $[y_0]_3 = [(1, 3)]_3$ are established. Here, the second concealed verification value $[y_0]_i$ may be handled as a secret sharing value conforming to Shamir's secret sharing scheme on a quadratic extension field of GF(5): $F^\varepsilon = GF(5^2)$. This is because a polynomial for obtaining a secret sharing value in accordance with the (2, N) Shamir's secret sharing scheme can be assumed to be $g(\chi) = y_0 + _y s_m \cdot \chi \in GF(5^2)$. Here, it is assumed that secret information $y_0 = (z_0, z_1)$, a random number $_y s_m = (2, 1)$, and the coordinate axis $\chi = (\eta, 0)$ hold. $\eta$ denotes an integer variable, $g(I)$ obtained when $\chi = I = (i, 0)$ is $[y_0]_i$, and $g(0)$ obtained when $\chi = (0, 0) = 0$ is $y_0$. Thus, the second concealed verification value $[y_m]_i$ can be handled as a secret sharing value conforming to the (K, N) Shamir's secret sharing scheme on the extension field $F^\varepsilon$ of the order $\varepsilon$.

The arithmetic unit of each secure computation device $P_i$ obtains a third concealed verification value $[r_m y_m]_i$ with secure computation by using the concealed extension field random number $[r_m]_i$ and the second concealed verification value $[y_m]_i$ and outputs the third concealed verification value $[r_m y_m]_i$. As described above, when the concealed authentication information $[w]_i$ is a secret sharing value conforming to the (K, N) Shamir's secret sharing scheme, the concealed authentication information $[\omega]_i$ is a secret sharing value conforming to the (K, N) Shamir's secret sharing scheme, each second concealed verification value $[y_m]_i$ is obtained by joining members of a sequence representing the first concealed verification value $[z]_i$, and the concealed extension field random number $[r_m]_i$ is a secret sharing value conforming to the (K, N) Shamir's secret sharing scheme, the arithmetic unit of each secure computation device $P_i$ can obtain the third concealed verification value $[r_m y_m]_i$ by using the second concealed verification value $[y_m]_i$ as a secret sharing value conforming to the (K, N) Shamir's secret sharing scheme. The arithmetic unit of each secure computation device $P_i$ performs computation (multiplication on the extension field $F^\varepsilon$) of $[r_m y_m]_i = [r_m]_i [y_m]_i$, for example. Two multiplication results of secret sharing values conforming to the (K, N) Shamir's secret sharing scheme are secret sharing values conforming to a (2K–1, N) Shamir's secret sharing scheme. Accordingly, the third concealed verification value $[r_m y_m]_i$ obtained as the above is a secret sharing value conforming to the (2K–1, N) Shamir's secret sharing scheme. When $K=2$, for example, the third concealed verification value $[r_m y_m]_i$ is a secret sharing value conforming to a (3, N) Shamir's secret sharing scheme. That is, a secret sharing value $[r_m]_i$ obtained by performing secret sharing of $r_m \in F^\varepsilon$ in accordance with the (2, N) Shamir's secret sharing scheme on the extension field $F^\varepsilon$ of the order $\varepsilon$ is expressed as the following, as is the case with formula (1).

$$[r_m]_i = r_m + _r s_m \cdot I \quad (3)$$

Here, $_r s_m \in F^\varepsilon$ represents an extension field random number. Formula (2) and formula (3) show that the following can be satisfied.

$$\begin{aligned} [r_m y_m]_i &= [r_m]_i [y_m]_i \\ &= (y_m + _y s_m \cdot I)(r_m + _r s_m \cdot I) \\ &= r_m \cdot y_m + (r_m \cdot _y s + _r s \cdot y_m) \cdot I + _r s \cdot _y s \cdot I^2 \in F^\varepsilon \end{aligned} \quad (4)$$

This shows that $[r_m y_m]_i$ is a secret sharing value of $r_m y_m$ conforming to the (3, N) Shamir's secret sharing scheme. This is because a polynomial for obtaining a secret sharing value in accordance with the (3, N) Shamir's secret sharing scheme on the extension field $F^\varepsilon$ of the order $\varepsilon$ can be assumed to be $g'(\chi) = r_m \cdot y_m + (r_m \cdot _y s + _r s \cdot y_m) \cdot \chi + _r s \cdot _y s \cdot \chi^2 \in F^\varepsilon$, and accordingly, $g'(I)$ obtained when $\chi = I = (i, 0, \ldots, 0)$ is $[r_m y_m]_i$ and $g'(0)$ obtained when $\chi = 0 = (0, 0, \ldots, 0)$ is $r_m y_m$.

Here, third concealed verification values $[r_0 y_0]_i, \ldots, [r_{M-1} y_{M-1}]_i$ may be outputted as concealed values of authentication results (scheme 1). However, if each secure computation device $P_i$ further performs the following processing, security can be further enhanced (scheme 2). In the scheme 2, the random number generation unit of each secure computation device $P_i$ further obtains a second concealed extension field random number $[R_m]_i = R_m + _R s_m \cdot I \in F^\varepsilon$ which is a secret sharing value of a second extension field random number $R_m \in F^\varepsilon$ in accordance with the (2, N) Shamir's secret sharing scheme on the extension field $F^\varepsilon$ of the order $\varepsilon$ and outputs the second concealed extension field random number $[R_m]_i$. As is the case with the above-described generation of the concealed extension field random number $[r_m]_i$, the second concealed extension field random number $[R_m]_i$ has to be generated in a state that the second extension field random number $R_m$ is concealed from any secure computation device $P_i$. Such a method is well-known and any method may be employed. The arithmetic unit of each secure computation device $P_i$ subsequently obtains an extension field multiplication value $[R_m]_i \cdot I = R_m \cdot I + _R s_m \cdot I^2 \in F^\varepsilon$ by using the second concealed extension field random number $[R_m]_i$ and I and outputs the extension field multiplication value $[R_m]_i \cdot I$. The arithmetic unit of each secure computation device $P_i$ further obtains a fourth concealed verification value $[r_m y_m]_i + [R_m]_i \cdot I = r_m \cdot y_m + (r_{m \cdot y} s_m + {}_r s_m \cdot y_m + R_m) \cdot I + ({}_r s_{m \cdot y} s_m + {}_R s_m) \cdot I_2 \in F^\varepsilon$ by using the third concealed verification value $[r_m y_m]_i$ and the extension field random number $[R_m]_i \cdot I$ and outputs the fourth concealed verification value $[r_m y_m]_i + [R_m]_i \cdot I$. Here, $[r_m y_m]_i + [R_m]_i \cdot I$ is a secret sharing value of $r_m \cdot y_m$ conforming to the (3, N) Shamir's secret sharing scheme on the extension field $F^\varepsilon$ of the order $\varepsilon$. This is because a polynomial for obtaining a secret sharing value in accordance with the (3, N) Shamir's secret sharing scheme on the extension field $F^\varepsilon$ of the order $\varepsilon$ can be assumed to be $g''(\chi) = r_m \cdot y_m + (r_{m \cdot y} s_m + {}_r s_m \cdot y_m + R_m) \cdot \chi + ({}_r s_{m \cdot y} s_m + {}_R s_m) \cdot \chi^2 \in F^\varepsilon$, and accordingly, g'(I) obtained when $\chi = I = (i, 0, \ldots, 0)$ is $[r_m y_m]_i$ and g'(0) obtained when $\chi = 0 = (0, 0, \ldots, 0)$ is $r_m \cdot y_m$.

The verification device determines that authentication is successful when $r_m y_m = 0$ is satisfied for all of $m = 0, \ldots, M-1$. On the other hand, the verification device determines that authentication is failed when $r_m y_m = 0$ is not satisfied for any of $m = 0, \ldots, M-1$. Processing of the verification device for the schemes 1 and 2 are described below.

In the scheme 1, when the third concealed verification value $[r_m y_m]_i$ is a secret sharing value conforming to a $(\kappa, N)$ Shamir's secret sharing scheme, at least $\kappa$ pieces of third concealed verification values $[r_m y_m]_{\varphi(1)}, \ldots, [r_m y_m]_{\varphi(\kappa)}$ which are mutually different are inputted into a reconstruction unit of the verification device and the reconstruction unit of the verification device reconstructs a verification value $r_m y_m$ by using the third concealed verification values $[r_m y_m]_{\varphi(1)}, \ldots, [r_m y_m]_{\varphi(\kappa)}$ and outputs the verification value $r_m y_m$. Here, $\kappa$ is a positive integer which is from 1 to N inclusive and $\{\varphi(1), \ldots, \varphi(\kappa)\} \subseteq \{1, \ldots, N\}$ holds. For example, when the third concealed verification value $[r_m y_m]_i$ is a secret sharing value conforming to the (2K−1, N) Shamir's secret sharing scheme, the reconstruction unit of the verification device reconstructs a verification value $r_m y_m$ by using third concealed verification values $[r_m y_m]_{\varphi(1)}, \ldots, [r_m y_m]_{\varphi(2K-1)}$ which are outputted from at least 2K−1 pieces of secure computation devices and outputs the verification value $r_m y_m$. A determination unit of the verification device determines that authentication is successful when $r_m y_m = 0$ is satisfied in any authentication information w for all of in $= 0, \ldots, M-1$. On the other hand, when $r_m y_m = 0$ is not satisfied in all pieces of authentication information w for any m, authentication is determined to be failed. Alternatively, in the scheme 1, the verification device may perform an operation including secure computation using at least part of $[r_0 y_0]_i, \ldots, [r_{M-1} y_{M-1}]_i$ and reconstruction and determine whether or not $r_m y_m = 0$ is satisfied for all of $m = 0, \ldots, M-1$ by using reconstructed values obtained through the operation. For example, the verification device may obtain secret sharing values $[r_0 y_0 + \ldots + r_{M-1} y_{M-1}]_\mu$ with secure computation using $[r_0 y_0]_\mu, \ldots, [r_{M-1} y_{M-1}]_\mu$, and determine that $r_m y_m = 0$ is satisfied for all of $m = 0, \ldots, M-1$ when $r_0 y_0 + \ldots + r_{M-1} y_{M-1}$ reconstructed from these secret sharing values $[r_0 y_0 + \ldots + r_{M-1} y_{M-1}]_\mu$ is 0 or determine that $r_m y_m = 0$ is not satisfied for any of $m = 0, \ldots, M-1$ when $r_0 y_0 + \ldots + r_{M-1} y_{M-1}$ is not 0. Here, $\mu = \varphi(1), \ldots, \varphi(\kappa)$ holds.

In the scheme 2, the verification device performs an operation with respect to $[r_m y_m]_{\varphi(1)} + [R_m]_{\varphi(1)} \cdot I$, $[r_m y_m]_{\varphi(2)} + [R_m]_{\varphi(2)} \cdot I$, and $[r_m y_m]_{\varphi(3)} + [R_m]_{\varphi(3)} \cdot I$ by using $[r_m y_m]_{\varphi(1)} + [R_m]_{\varphi(1)} \cdot I$, $[r_m y_m]_{\varphi(2)} + [R_m]_{\varphi(2)} \cdot I$, and $[r_m y_m]_{\varphi(3)} + [R_m]_{\varphi(3)} \cdot I$ among the above-described fourth concealed verification values $[r_m y_m]_i + [R_m]_i \cdot I$ in accordance with the (3, N) Shamir's secret sharing scheme on the extension field $F^\varepsilon$ of the order $\varepsilon$, and determines that authentication is successful when $r_m y_m = 0$ is satisfied for all of $m = 0, \ldots, M-1$. For example, $[r_m y_m]_{\varphi(1)} + [R_m]_{\varphi(1)} \cdot I$, $[r_m y_m]_{\varphi(2)} + [R_m]_{\varphi(2)} \cdot I$, and $[r_m y_m]_{\varphi(3)} + [R_m]_{\varphi(3)} \cdot I$ are inputted into the reconstruction unit of the verification device and the reconstruction unit of the verification device reconstructs a verification value $r_m y_m$ by using these and outputs the verification value $r_m y_m$. The determination unit of the verification device determines that authentication is successful when $r_m y_m = 0$ is satisfied in any authentication information w for all of $m = 0, \ldots, M-1$. On the other hand, when $r_m y_m = 0$ is not satisfied in all pieces of authentication information w for any m, authentication is determined to be failed. Alternatively, in the scheme 2, the verification device may perform an operation including secure computation using at least part of $[r_0 y_0]_{i''} + [R_0]_{i''} \cdot I''$, $\ldots$, $[r_{M-1} y_{M-1}]_{i''} + [R_{M-1}]_{i''} \cdot I''$ and reconstruction and determine whether or not $r_m y_m = 0$ is satisfied for all of $m = 0, \ldots, M-1$ by using reconstructed values obtained through the operation. Here, $i'' = \varphi(1), \varphi(2), \varphi(3)$ and $I'' = (i'', 0, \ldots, 0) \in F_\varepsilon$ hold. For example, the verification device may obtain a secret sharing value $[r_0 y_0 + \ldots + r_{M-1} y_{M-1}]_{i''}$ with secure computation using $[r_0 y_0]_{i''} + [R_0]_{i''} \cdot I''$, $\ldots$, $[r_{M-1} y_{M-1}]_{i''} + [R_{M-1}]_{i''} \cdot I''$, and determine that $r_m y_m = 0$ is satisfied for all of $m = 0, \ldots, M-1$ when $r_0 y_0 + \ldots + r_{M-1} y_{M-1}$ obtained by reconstructing the secret sharing value $[r_0 y_0 + \ldots + r_{M-1} y_{M-1}]_{i''}$ is 0 or determine that $r_m y_m = 0$ is not satisfied for any of $m = 0, \ldots, M-1$ when $r_0 y_0 + \ldots + r_{M-1} y_{M-1}$ is not 0.

In the above-described method, the use of the concealed extension field random number $[r_m]_i$ can prevent generation of unauthorized concealed verification values, with which $r_m y_m = 0$ is reconstructed even when $w - \omega \neq 0$, and resulting determination of successful authentication. Further, $r_m y_m = 0$ is established irrespective of a value of an extension field random number $r_m$ when $w - \omega = 0$, so that authentication is not determined to be failed even when $w - \omega = 0$. Further, since each processing is performed with secure computation, authentication processing can be performed while keeping authentication information secret. Thus, authentication processing with high level of security against spoofing can be performed while keeping authentication information secret.

First Embodiment

A first embodiment according to the present invention is now described with reference to the accompanying drawings. The first embodiment is an example of the scheme 1.

<Configuration>

As illustrated in FIG. 1, a secure computation authentication system 1 according to the present embodiment includes a user device 11, a plurality of pieces of secure computation devices 12-1, . . . , 12-N, and a verification device 13 which are communicably connected via a network. N in the present embodiment denotes an integer which is 2 or greater. Note that the secure computation authentication system 1 of FIG. 1 includes a single piece of user device 11 and a single piece of verification device 13 so as to simplify the description, but the secure computation authentication system 1 may include two or more pieces of user devices 11 and/or verification devices 13.

Figure 2:
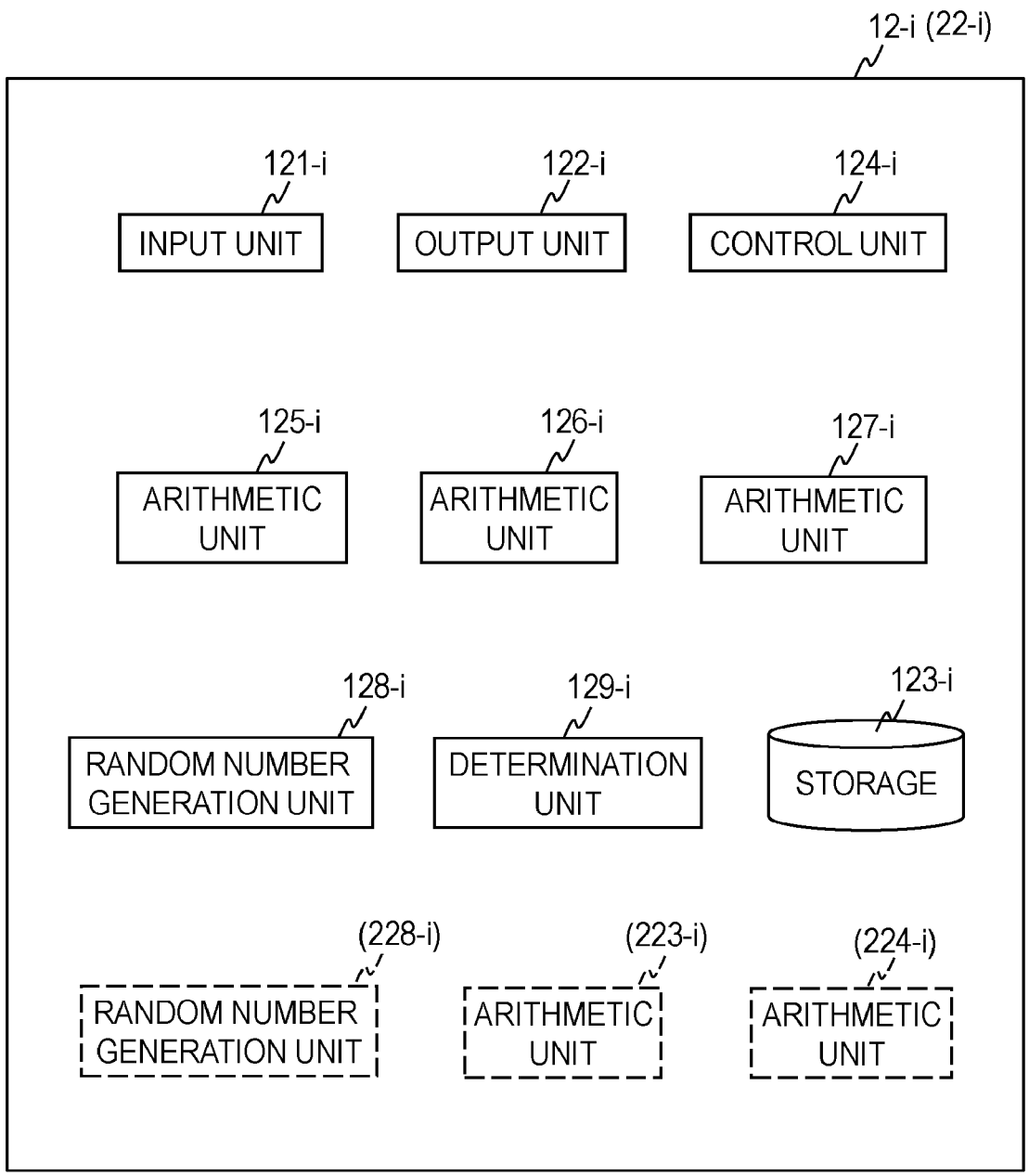
FIG. 2 is a block diagram illustrating the functional configuration of a secure computation device according to the embodiments.

As illustrated in FIG. 2, the secure computation device 12-i of the present embodiment includes an input unit 121-i, an output unit 122-i, a control unit 124-i, arithmetic units 125-i, 126-i, and 127-i, a random number generation unit 128-i, a determination unit 129-i, and a storage 123-i. The secure computation device 12-i executes each processing under the control of the control unit 124-i and data obtained in each unit is stored in the storage 123-i and read out and used for other processing as needed. As illustrated in FIG.

Figure 3A:
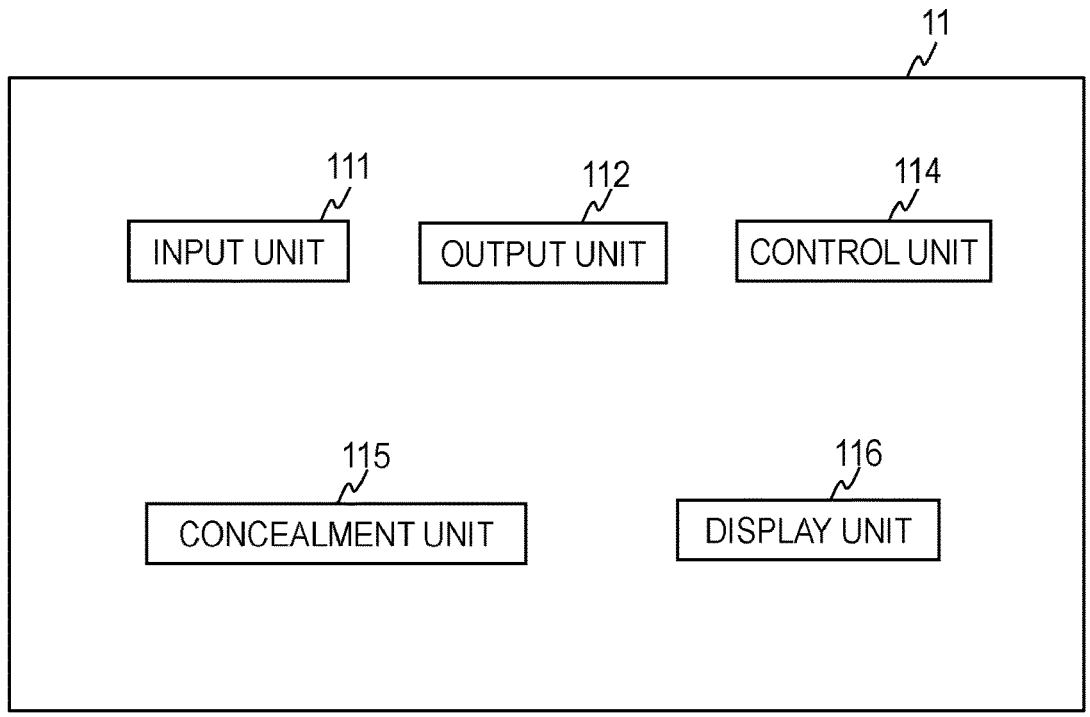
FIG. 3A is a block diagram illustrating the functional configuration of a user device according to the embodiments.
Figure 3B:
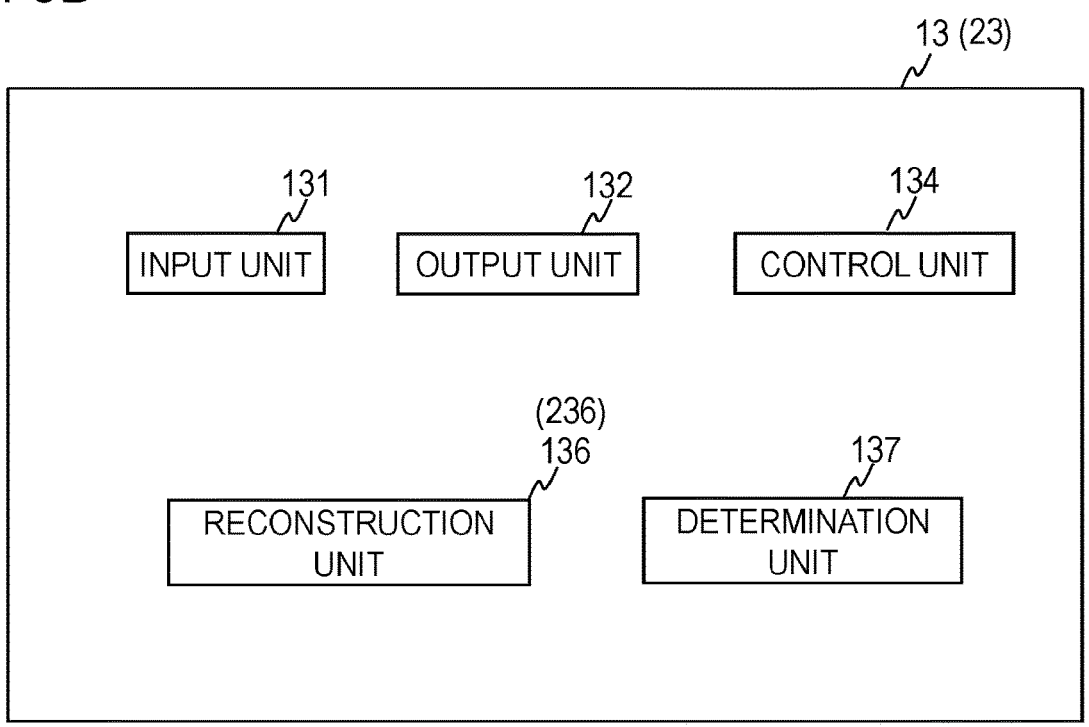
FIG. 3B is a block diagram illustrating the functional configuration of a verification device according to the embodiments.

3A, the user device 11 of the present embodiment includes an input unit 111, an output unit 112, a control unit 114, a concealment unit 115, and a display unit 116. The user device 11 executes each processing under the control of the control unit 114 and data obtained in each unit is stored in a storage (not shown) and read out and used for other processing as needed. As illustrated in FIG. 3B, the verification device 13 of the present embodiment includes an input unit 131, an output unit 132, a control unit 134, a reconstruction unit 136, and a determination unit 137. The verification device 13 executes each processing under the control of the control unit 134 and data obtained in each unit is stored in a storage (not shown) and read out and used for other processing as needed.

<Preprocessing>

A single piece or a plurality of pieces of concealed authentication information $[w]_i \in [F]^L$ which is/are pre-registered is/are stored in the storage 123-$i$ of each secure computation device 12-$i$ (where $i=1, \ldots, N$). Authentication information $w$ itself is not made public to each secure computation device 12-$i$. A secret sharing scheme employed in the secure computation authentication system 1 is predetermined, and the user device 11, a plurality of pieces of secure computation devices 12-1, . . . , 12-N, and the verification device 13 perform secure computation with respect to a secret sharing value conforming to this secret sharing scheme.

<Secure Computation Authentication Processing>

Figure 4:
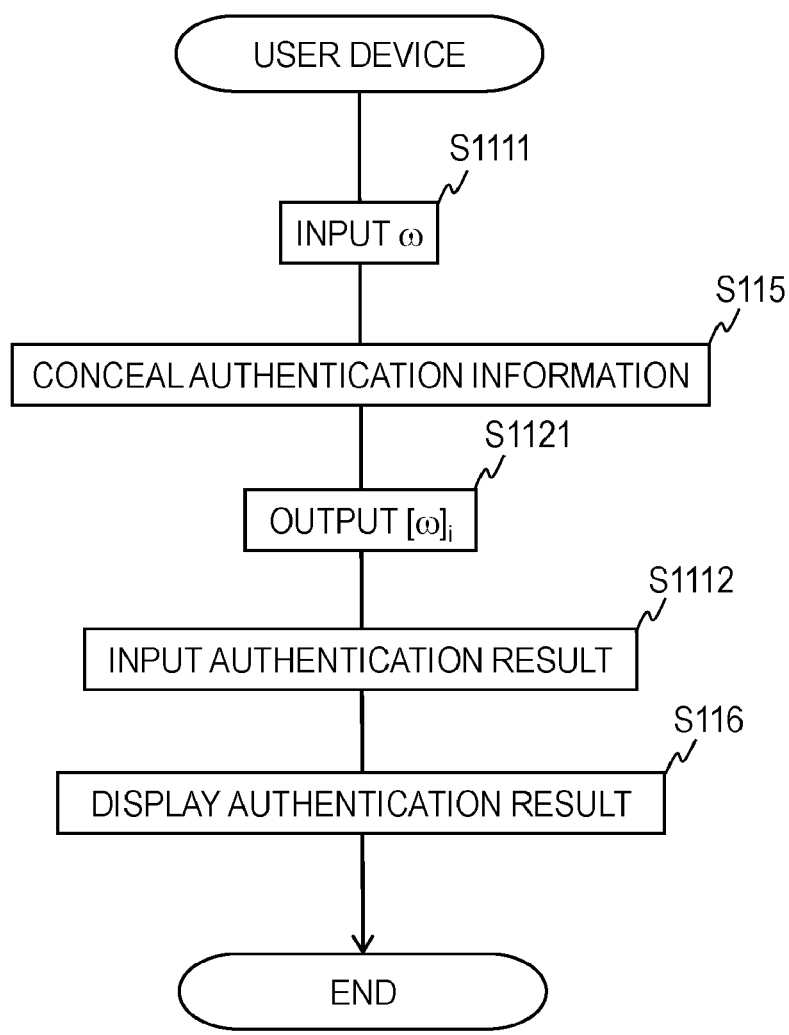
FIG. 4 is a flow diagram for explaining processing of the user device according to the embodiments.

As illustrated in FIG. 4, a user first inputs authentication information $\omega$ into the input unit 111 of the user device 11 (FIG. 3A) (step S1111). The authentication information $\omega$ is transmitted to the concealment unit 115, and the concealment unit 115 obtains and outputs concealed authentication information $[\omega]_i$ (where $i=1, \ldots, N$) which is a secret sharing value of this authentication information $\omega$ (step S115). The concealed authentication information $[\omega]_i$ is transmitted to the output unit 112, and the output unit 112 outputs the concealed authentication information $[\omega]_i$ to each secure computation device 12-$i$ (step S1121).

Figure 5:
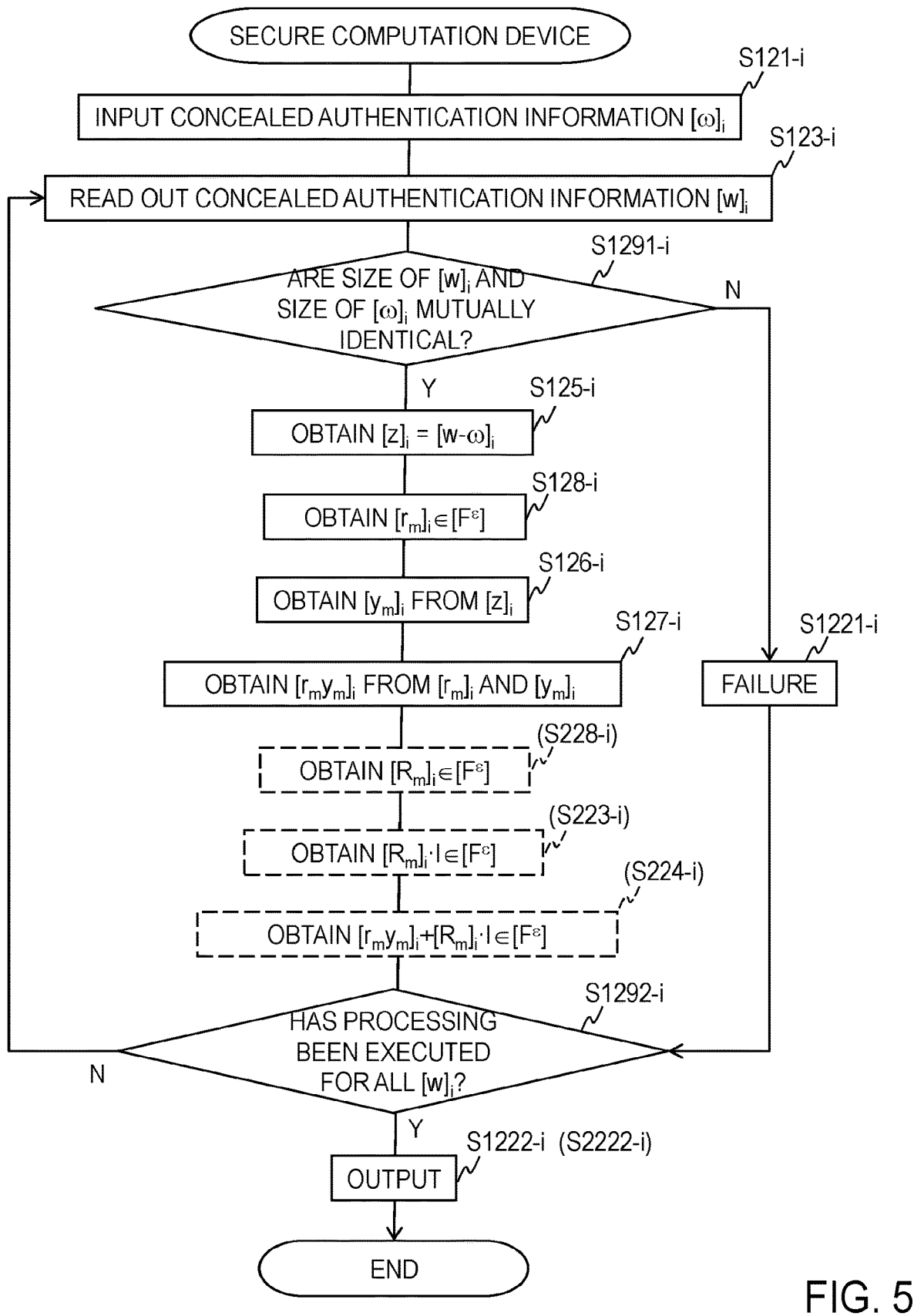
FIG. 5 is a flow diagram for explaining processing of the secure computation device according to the embodiments.

As illustrated in FIG. 5, each concealed authentication information $[\omega]_i$ is transmitted to each secure computation device 12-$i$ (FIG. 2) via a network and inputted into the input unit 121-$i$ (step S121-$i$). The concealed authentication information $[\omega]_i$ is inputted into the determination unit 129-$i$. The determination unit 129-$i$ reads out any concealed authentication information $[w]_i$ (for example, any concealed authentication information $[w]_i$ to which processing on and after step S1291-$i$ has not been performed) from the storage 123-$i$ (step S123-$i$) and determines whether or not the size of the concealed authentication information $[\omega]_i$ and the size of the concealed authentication information $[w]_i$ are mutually identical (step S1291-$i$). When it is determined that these are not mutually identical, information representing "failure" is outputted (step S1221-$i$) and the processing goes to step S1292-$i$.

Figure 7:
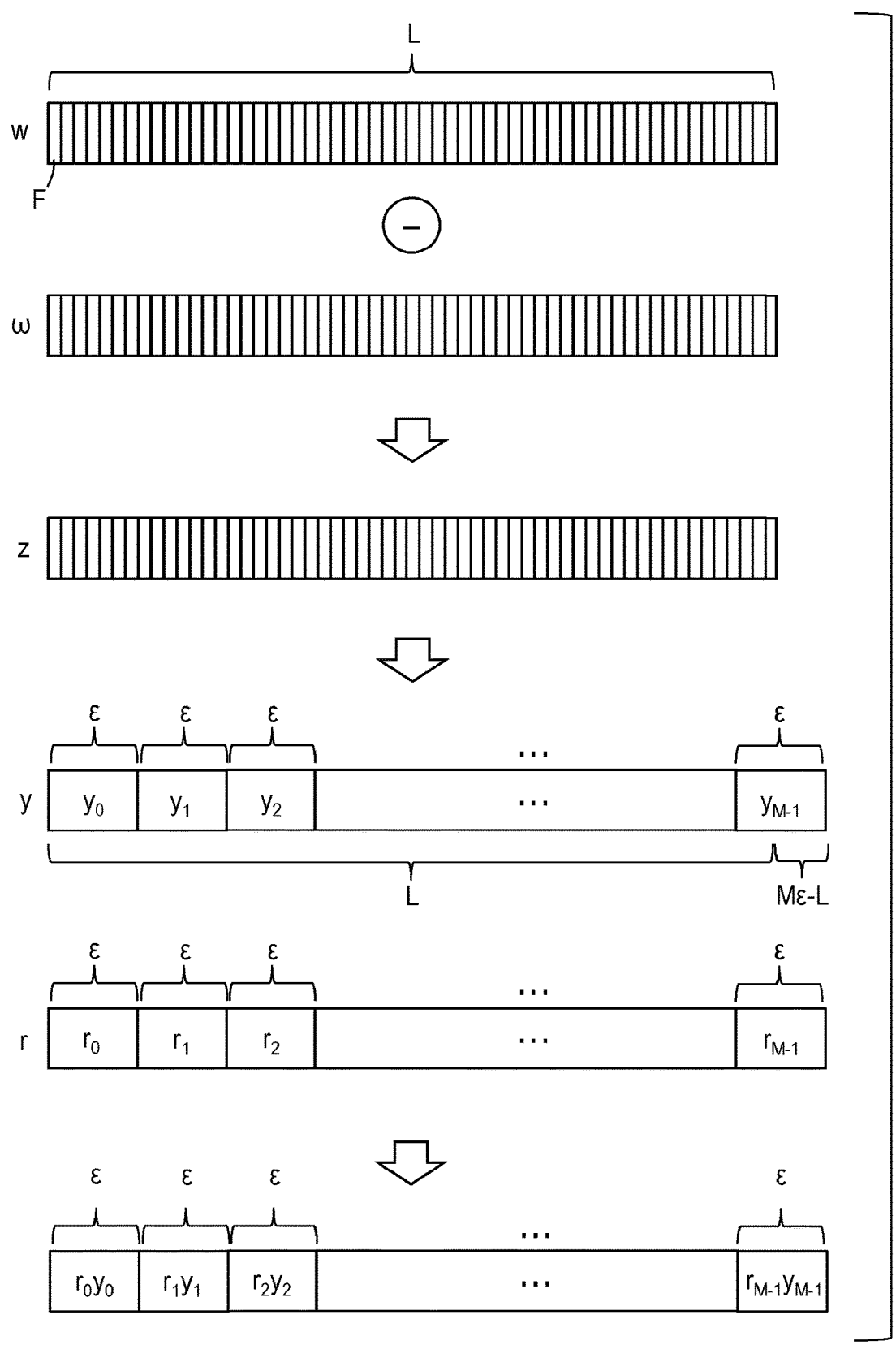
FIG. 7 is a conceptual diagram for explaining processing according to the embodiments.

On the other hand, when it is determined that the size of the concealed authentication information $[\omega]_i$ and the size of the concealed authentication information $[w]_i$ are mutually identical, the arithmetic unit 125-$i$ (first arithmetic unit) obtains a concealed verification value $[z]_i=[w-\omega]_i$ (first concealed verification value) with secure computation by using these concealed authentication information $[\omega]_i$ and concealed authentication information $[w]_i$ as inputs and outputs the concealed verification value $[z]_i$ (step S125-$i$, FIG. 7). The random number generation unit 128-$i$ obtains and outputs a concealed extension field random number $[r_m]_i \in [F^\varepsilon]$ (where $m=0, \ldots, M-1$ and $M=\text{ceil}(L/\varepsilon)$) which is a secret sharing value of the extension field random number $r_m$ (step S128-$i$, FIG. 7). The arithmetic unit 126-$i$ (second arithmetic unit) obtains a concealed verification value $[y_m]_i$ (second concealed verification value) in which $y_m$ is concealed with secure computation by using the concealed verification value $[z]_i$ as an input and outputs the concealed verification value $[y_m]_i$. Here, $z=(z_0, \ldots, z_{L-1})=w-\omega$, $z_j \in F$, $j=0, \ldots, L-1$, and $y_m=(z_{\varepsilon m}, \ldots, z_{\varepsilon(m+1)-1})$ hold, and $z_q$ by which $q>L-1$ is established among $q=\varepsilon(M-1), \ldots, \varepsilon M-1$ is 0. That is, when $M\varepsilon - L = 0$, each sequence obtained by dividing a sequence of $z_0, \ldots, z_{L-1}$ by M is $y_m=(z_{\varepsilon m}, \ldots, z_{\varepsilon(m+1)-1})$, as illustrated in FIG. 7. When $M\varepsilon - L \neq 0$, $y_m=(z_{\varepsilon m}, \ldots, z_{\varepsilon(m+1)-1})$ is established for $m=0, \ldots, M-2$ and $(z_{\varepsilon(M-1)}, \ldots, z_{L-1}, 0, \ldots, 0)$, which is composed of $z_{\varepsilon(M-1)}, \ldots, z_{L-1}$ and $M\varepsilon - L$ pieces of 0, is $y_{M-1}$ for $m=M-1$ (step S126-$i$). The arithmetic unit 127-$i$ (third arithmetic unit) obtains a concealed verification value $[r_m y_m]_i$ (third concealed verification value) with secure computation by using the concealed extension field random number $[r_m]_i$ and the concealed verification value $[y_m]_i$ as inputs and outputs the concealed verification value $[r_m y_m]_i$, and the processing goes to step S1292-$i$ (step S127-$i$).

In step S1292-$i$, whether or not processing on and after step S123-$i$ has been executed is determined for all pieces of concealed authentication information $[w]_i$ stored in the storage 123-$i$ (step S1292-$i$). When the processing on and after step S123-$i$ has not been executed for all pieces of concealed authentication information $[w]_i$, the processing is returned to step S123-$i$. On the other hand, when the processing on and after step S123-$i$ has been executed for all pieces of concealed authentication information $[w]_i$, the processing of step S1222-$i$ is executed.

In step S1222-$i$, the concealed verification value $[r_m y_m]_i$ obtained in step S127-$i$ is inputted into the output unit 122-$i$. When there is no concealed verification value $[r_m y_m]_i$ obtained in step S127-$i$, information representing "failure" is inputted into the output unit 122-$i$. The output unit 122-$i$ outputs the concealed verification value $[r_m y_m]_i$ or the information representing "failure" to the verification device 13 (step S1222-$i$).

Figure 6:
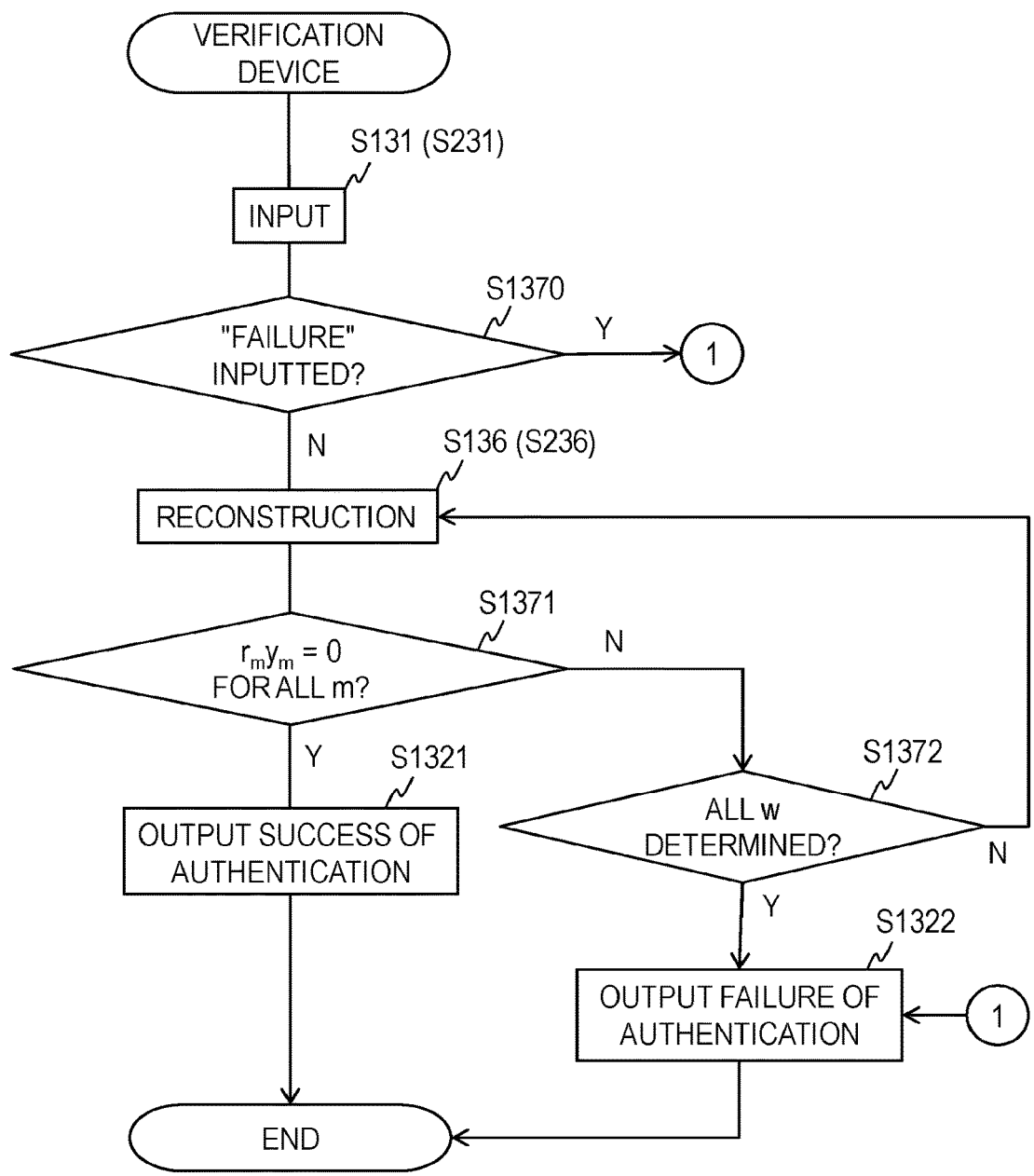
FIG. 6 is a flow diagram for explaining processing of the verification device according to the embodiments.

As illustrated in FIG. 6, the concealed verification value $[r_m y_m]_i$ or the information representing "failure" is transmitted to the verification device 13 via a network and inputted into the input unit 131 of the verification device 13 (FIG. 3B) (step S131). When the information representing "failure" is inputted, processing of step S1322 is executed. On the other hand, when information representing the concealed verification value $[r_m y_m]_i$ is inputted, processing on and after step S136 is executed (step S1370).

In step S136, the reconstruction unit 136 reconstructs the verification value $r_m y_m$ by using concealed verification values $[r_m y_m]_{\varphi(1)}, \ldots, [r_m y_m]_{\varphi(K)}$, which correspond to an identical $w$, and outputs the verification value $r_m y_m$. Here, $\{\varphi(1), \ldots, \varphi(K)\} \subseteq \{1, \ldots, N\}$ holds When it is determined that $r_m y_m=0$ is satisfied for all of $m=0, \ldots, M-1$, the determination unit 137 outputs "information representing that authentication is successful" (step S1321). On the other hand, when it is determined that $r_m y_m=0$ is not satisfied for any m, the determination unit 137 subsequently determines whether or not processing of step S136 has been performed for all $w$ (step S1372). When it is determined that processing of step S136 has not been performed for any $w$, the processing returns to step S136. On the other hand, when it is determined that the processing of step S136 has been performed for all $w$, processing of step S1322 is executed. In step S1322, the determination unit 137 outputs "information representing that authentication is failed" (step S1322).

An authentication result which is the "information representing that authentication is successful" outputted in step S1321 or the "information representing that authentication is failed" outputted in step S1322 is inputted into the output unit 132. The output unit 132 outputs the authentication result to the user device 11. The authentication result is inputted into the input unit 111 of the user device 11 (FIG. 3A) (step S1112) and displayed from the display unit 116 (step S116).

Modification of First Embodiment

The verification device 13 may perform an operation including secure computation using at least part of $[r_0y_0]_i, \ldots, [r_{M-1}y_{M-1}]_i$ and reconstruction and determine whether or not $r_my_m=0$ is satisfied for all of m=0, ..., M−1 by using a reconstructed value obtained through the operation. As well as the above-described example, the verification device 13 may obtain secret sharing values $[r_0y_0+r_1y_1]_\mu$, $[r_2y_2+r_3y_3]_\mu, \ldots, [r_{M-2}y_{M-2}+r_{M-1}y_{M-1}]_\mu$ with secure computation using $[r_0y_0]_\mu, \ldots, [r_{M-1}y_{M-1}]_\mu$, and determine that $r_my_m=0$ is satisfied for all of m=0, ..., M−1 when all of $r_0y_0+r_1y_1, r_2y_2+r_3y_3, \ldots, r_{M-2}y_{M-2}+r_{M-1}y_{M-1}$ reconstructed from these secret sharing values $[r_0y_0+r_1y_1]_\mu, [r_2y_2+r_3y_3]_\mu, \ldots, [r_{M-2}y_{M-2}+r_{M-1}y_{M-1}]_\mu$ are 0 or determine that $r_my_m=0$ is not satisfied for any of in =0, ..., M−1 when any of $r_0y_0+r_1y_1, r_2y_2+r_3y_3, \ldots, r_{M-2}y_{M-2}+r_{M-1}y_{M-1}$ is not 0, for example.

Second Embodiment

A second embodiment according to the present invention is next described with reference to the accompanying drawings. The second embodiment is an example of the scheme 2. Differences from the first embodiment are mainly described and description of common matters to the first embodiment is simplified by referring to the same reference characters below. Further, not explained one by one below, the present embodiment employs the (2, N) Shamir's secret sharing scheme as a secret sharing scheme unless otherwise specifically noted.

<Configuration>

As illustrated in FIG. 1, a secure computation authentication system 2 according to the present embodiment includes a user device 11, a plurality of pieces of secure computation devices 22-1, ..., 22-N, and a verification device 23 which are communicably connected via a network. N in the present embodiment denotes an integer which is 3 or greater. Note that the secure computation authentication system 2 of FIG. 1 includes a single piece of user device 11 and a single piece of verification device 23 so as to simplify the description, but the secure computation authentication system 2 may include two or more pieces of user devices 11 and/or verification devices 23.

As illustrated in FIG. 2, the secure computation device 22-i of the present embodiment includes an input unit 121-i, an output unit 122-i, a control unit 124-i, arithmetic units 125-i, 126-i, 127-i, 223-i, and 224-i, random number generation units 128-i and 228-i, a determination unit 129-i, and a storage 123-i. The secure computation device 22-i executes each processing under the control of the control unit 124-i and data obtained in each unit is stored in the storage 123-i and read out and used for other processing as needed. As illustrated in FIG. 3B, the verification device 23 of the present embodiment includes an input unit 131, an output unit 132, a control unit 134, a reconstruction unit 236, and a determination unit 137. The verification device 23 executes each processing under the control of the control unit 134 and data obtained in each unit is stored in a storage (not shown) and read out and used for other processing as needed.

<Preprocessing>

Same as the first embodiment.

<Secure Computation Authentication Processing>

As illustrated in FIG. 4, the processing of steps S111, S115, and S1121 described in the first embodiment is executed. Accordingly, each concealed authentication information $[\omega]_i$ outputted from the user device 11 is inputted into the input unit 121-i of each secure computation device 22-i (FIG. 2) (step S121-i). Then, the processing of steps S123-i and S1291-i described in the first embodiment is executed, and information representing "failure" is outputted when it is determined that the size of the concealed authentication information $[\omega]_i$ and the size of the concealed authentication information $[w]_i$ are not mutually identical in step S1291-i (step S1221-i), and the processing goes to step S1292-i. On the other hand, when it is determined that the size of the concealed authentication information $[\omega]_i$ and the size of the concealed authentication information $[w]_i$ are mutually identical, the processing of steps S125-i, S128-i, S126-i, and S127-i described in the first embodiment is executed. In the present embodiment, $r_m \in F^\varepsilon$, $_rs_m \in F^\varepsilon$, $_ys_m \in F^\varepsilon$, $I \in F^\varepsilon$, $[r_m]_i = r_m + _rs_m \cdot I \in F^\varepsilon$, $[y_m]_i = y_m + _ys_m \cdot I \in F^\varepsilon$, and $[r_my_m]_i = r_m \cdot y_m + (r_m \cdot _ys_m + _rs_m \cdot y_m) \cdot I + _rs_m \cdot _ys_m \cdot I^2 \in F^\varepsilon$ hold.

After that, the random number generation unit 228-i (second random number generation unit) obtains and outputs a concealed extension field random number (second concealed extension field random number) $[R_m]_i = R_m + _Rs_m \cdot I \in F^\varepsilon$ which is a secret sharing value of the extension field random number (second extension field random number) $R_m \in F^\varepsilon$ (step S228-i). Then, the arithmetic unit 223-i (fourth arithmetic unit) multiplies the concealed extension field random number $[R_m]_i$ by I on the extension field $F^\varepsilon$ of the order ε to obtain and output an extension field multiplication value $[R_m]_i \cdot I = R_m \cdot I + _Rs_m \cdot I^2 \in F^\varepsilon$. Here, $_Rs_m \in F^\varepsilon$ holds (step S223-i). Further, the arithmetic unit 224-i (fifth arithmetic unit) obtains a concealed verification value (fourth concealed verification value) $[r_my_m]_i + [R_m]_i \cdot I = r_m \cdot y_m + (r_m \cdot _ys_m + _rs_m \cdot y_m + R_m) \cdot I + (_rs_m \cdot _ys_m + _Rs_m) \cdot I^2 \in F^\varepsilon$ by using the concealed verification value $[r_my_m]_i$ and the extension field multiplication value $[R_m]_i \cdot I$ and outputs the concealed verification value $[r_my_m]_i + [R_m]_i \cdot I$ (step S224-i).

In step S1292-i, whether or not processing on and after step S123-i has been executed is determined for all pieces of concealed authentication information $[w]_i$ stored in the storage 123-i (step S1292-i). When the processing on and after step S123-i has not been executed for all pieces of concealed authentication information $[w]_i$, the processing is returned to step S123-i. On the other hand, when the processing on and after step S123-i has been executed for all pieces of concealed authentication information $[w]_i$, the processing of step S2222-i is executed.

In step S2222-i, the concealed verification value $[r_my_m]_i + [R_m]_i \cdot I$ obtained in step S224-i is inputted into the output unit 122-i. When there is no concealed verification values obtained in step S224-i, information representing "failure" is inputted into the output unit 122-i. The output unit 122-i outputs the concealed verification value $[r_my_m]_i + [R_m]_i \cdot I$ or the information representing "failure" to the verification device 13 (step S2222-i).

As illustrated in FIG. 6, the concealed verification value $[r_my_m]_i + [R_m]_i \cdot I$ or the information representing "failure" is transmitted to the verification device 23 via a network and inputted into the input unit 131 of the verification device 23 (FIG. 3B) (step S231). When the information representing "failure" is inputted, processing of step S1322 is executed. On the other hand, when information representing the concealed verification value $[r_m y_m]_i + [R_m]_i \cdot I$ is inputted, processing on and after step S236 is executed.

In step S236, the reconstruction unit 236 reconstructs the verification value $r_m y_m$ by using $[r_m y_m]_{K(1)} + [R_m]_{K(1)} \cdot I$, $[r_m y_m]_{K(2)} + [R_m]_{K(2)} \cdot I$, and $[r_m y_m]_{K(3)} + [R_m]_{K(3)} \cdot I$ in accordance with the (3, N) Shamir's secret sharing scheme and outputs the verification value $r_m y_m$. Here, $\{K(1), K(2), K(3)\} \subseteq \{1, \ldots, N\}$ holds (step S236). The determination unit 137 determines whether or not $r_m y_m = 0$ is satisfied for all of $m = 0, \ldots, M-1$ by using $r_0 y_0, \ldots, r_{M-1} y_{M-1}$ as inputs (step S1371). When it is determined that $r_m y_m = 0$ is satisfied for all of $m = 0, \ldots, M-1$, the determination unit 137 outputs "information representing that authentication is successful" (step S1321). On the other hand, when it is determined that $r_m y_m = 0$ is not satisfied for any m, the determination unit 137 subsequently determines whether or not processing of step S236 has been performed for all w (step S1372). When it is determined that the processing of step S236 has not been performed for any w, the processing returns to step S236. On the other hand, when it is determined that processing of step S236 is performed for all w, processing of step S1322 is executed. In step S1322, the determination unit 137 outputs "information representing that authentication is failed" (step S1322). Processing on and after this is the same as that of the first embodiment.

Modification of Second Embodiment

The verification device 23 may perform an operation including secure computation using at least part of $[r_0 y_0]_{i''} + [R_0]_{i''} \cdot I''$, $\ldots$, $[r_{M-1} y_{M-1}]_{i''} + [R_{M-1}]_{i''} \cdot I''$ and reconstruction and determine whether or not $r_m y_m = 0$ is satisfied for all of $m = 0, \ldots, M-1$ by using a reconstructed value obtained through the operation. Here, $i'' = \varphi(1), \varphi(2), \varphi(3)$ and $I'' = (i'', 0, \ldots, 0) \in F^\varepsilon$ hold. As well as the above-described example, the verification device 23 may generate secret sharing values for $r_0 y_0 + r_1 y_1, r_2 y_2 + r_3 y_3, \ldots, r_{M-2} y_{M-2} + r_{M-1} y_{M-1}$ with secure computation using $[r_0 y_0]_{i''} + [R_0]_{i''} \cdot I''$, $\ldots$, $[r_{M-1} y_{M-1}]_{i''} + [R_{M-1}]_{i''} \cdot I''$, and determine that $r_m y_m = 0$ is satisfied for all of $m = 0, \ldots, M-1$ when all of $r_0 y_0 + r_1 y_1, r_2 y_2 + r_3 y_3, \ldots, r_{M-2} y_{M-2} + r_{M-1} y_{M-1}$ reconstructed from these secret sharing values are 0 or determine that $r_m y_m = 0$ is not satisfied for any of $m = 0, \ldots, M-1$ when any of $r_0 y_0 + r_1 y_1, r_2 y_2 + r_3 y_3, \ldots, r_{M-2} y_{M-2} + r_{M-1} y_{M-1}$ is not 0.

[Modification Etc.]

The present invention is not limited to the above-described embodiments. For example, at least part of the secure computation devices 12-1 to 12-N (for example, all of the secure computation devices 12-1 to 12-N) may include the user device 11 and/or include the verification device 13. Further, all secret sharing values handled in each unit of each device may conform to the same secret sharing scheme or do not have to do so. In the latter case, a secret sharing value conforming to a specific secret sharing scheme may be converted into a secret sharing value conforming to another secret sharing scheme by a well-known secret sharing value conversion method. Further, "obtaining β by using α" may be calculating β through computation using α or extracting β which has been preliminarily computed by retrieval processing using α.

The above-described various kinds of processing may be executed, in addition to being executed in chronological order in accordance with the descriptions, in parallel or individually depending on the processing power of a device that executes the processing or when necessary. In addition, it goes without saying that changes may be made as appropriate without departing from the spirit of the present invention.

The above-described each device is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional components by loading of programs like a CPU. An electronic circuit constituting a single device may include multiple CPUs.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present devices, at least some of the processing functions may be implemented by hardware.

DESCRIPTION OF REFERENCE NUMERALS 1, 2 secure computation authentication system
11 user device
12-$i$, 22-$i$ secure computation device
13, 23 verification device

What is claimed is:

1. A secure computation device, in which
L is an integer which is 1 or greater, $\varepsilon$ is an integer which is 2 or greater, F is a finite field, $F^\varepsilon$ is an extension field of the finite field F, an extension degree of the extension field $F^\varepsilon$ is $\varepsilon$, ceil(x) is a minimum integer which is equal to or greater than a real number x, M=ceil(L/$\varepsilon$) holds, j=0, ..., L−1 holds, and m=0, ..., M−1 holds,
the secure computation device comprising:
a storage that stores concealed authentication information $[w]_i \in [F]^L$ which is a secret sharing value of authentication information w;
an input unit that receives input of concealed authentication information $[\omega]_i \in [F]^L$ which is a secret sharing value of authentication information $\omega$;
a first arithmetic unit that obtains a first concealed verification value $[z]_i = [w-\omega]_i$ with secure computation by using the concealed authentication information $[w]_i$ and the concealed authentication information $[\omega]_i$;
a random number generation unit that obtains a concealed extension field random number $[r_m]_i \in [F^\varepsilon]$ which is a secret sharing value of an extension field random number $r_m$;
a second arithmetic unit that obtains a second concealed verification value $[y_m]_i$ in which $y_m$ is concealed with secure computation by using the first concealed verification value $[z]_i$, where $z=(z_0, \ldots, z_{L-1})=w-\omega$ holds, $z_j \in F$ holds, $y_m=(z_{\varepsilon m}, \ldots, z_{\varepsilon(m+1)-1})$ holds for m=0, ..., M−1, and $z_q$ by which q>L−1 is established among q=$\varepsilon$(M−1), ..., $\varepsilon$M−1 is 0; and
a third arithmetic unit that obtains a third concealed verification value $[r_m y_m]_i$ with secure computation by using the concealed extension field random number $[r_m]_i$ and the second concealed verification value $[y_m]_i$ and outputs the third concealed verification value $[r_m y_m]_i$.

2. The secure computation device according to claim 1, wherein M is an integer which is 2 or greater.

3. The secure computation device according to claim 1 or 2, wherein
K and N are integers which are 2 or greater, where K≤N holds,
the concealed extension field random number $[r_m]_i$ is a secret sharing value conforming to a (K, N) Shamir's secret sharing scheme,
the second arithmetic unit obtains the second concealed verification value $[y_m]_i$ by joining members of a sequence representing the first concealed verification value $[z]_i$,
the third arithmetic unit obtains the third concealed verification value $[r_m y_m]_i$ by using the second concealed verification value $[y_m]_i$ as a secret sharing value conforming to the (K, N) Shamir's secret sharing scheme, and
the third concealed verification value $[r_m y_m]_i$ is a secret sharing value conforming to a (2K−1, N) Shamir's secret sharing scheme.

4. The secure computation device according to claim 3, wherein K=2 holds.

5. The secure computation device according to claim 4, in which $r_m \in F^\varepsilon$, $_r s_m \in F^\varepsilon$, $_y s_m \in F^\varepsilon$, $_R s_m \in F^\varepsilon$, $I \in F^\varepsilon$, $[r_m]_i = r_m + _r s_m \cdot I \in F^\varepsilon$, $[y_m]_i = y_m + _y s_m \cdot I \in F^\varepsilon$, and $[r_m y_m]_i = r_m \cdot y_m + (r_m \cdot _y s_m + _r s_m \cdot y_m) \cdot I + _r s_m \cdot _y s_m \cdot I^2 \in F^\varepsilon$ hold,
the secure computation device further comprising:
a second random number generation unit that obtains a second concealed extension field random number $[R_m]_i = R_m + _R s_m \cdot I \in F^\varepsilon$ which is a secret sharing value of a second extension field random number $R_m \in F^\varepsilon$;
a fourth arithmetic unit that obtains an extension field multiplication value $[R_m]_i \cdot I = R_m \cdot I + _R s_m \cdot I^2 \in F^\varepsilon$; and
a fifth arithmetic unit that obtains and outputs a fourth concealed verification value $[r_m y_m]_i + [R_m]_i \cdot I = r_m \cdot y_m + (r_m \cdot _y s_m + _r s_m \cdot y_m + R_m) \cdot I + (_r s_m \cdot _y s_m + _R s_m) \cdot I^2 \in F^\varepsilon$.

6. A secure computation authentication system comprising:
a plurality of secure computation devices; and
a verification device, wherein
L is an integer which is 1 or greater, s is an integer which is 2 or greater, F is a finite field, $F^\varepsilon$ is an extension field of the finite field F, an extension degree of the extension field $F^\varepsilon$ is $\varepsilon$, ceil(x) is a minimum integer which is equal to or greater than a real number x, M=ceil(L/$\varepsilon$) holds, j=0, ..., L−1 holds, and m=0, ..., M−1 holds,
each of the secure computation devices includes
a storage that stores concealed authentication information $[W]_i \in [F]^L$ which is a secret sharing value of authentication information w,
a first input unit that receives input of concealed authentication information $[\omega]_i \in [F]^L$ which is a secret sharing value of authentication information $\omega$,
a first arithmetic unit that obtains a first concealed verification value $[z]_i = [w-\omega]_i$ with secure computation by using the concealed authentication information $[w]_i$ and the concealed authentication information $[\omega]_i$,
a random number generation unit that obtains a concealed extension field random number $[r_m]_i \in [F^\varepsilon]$ which is a secret sharing value of an extension field random number $r_m$,
a second arithmetic unit that obtains a second concealed verification value $[y_m]_i$ in which $y_m$ is concealed with secure computation by using the first concealed verification value $[z]_i$, where $z=(z_0, \ldots, z_{L-1})=w-\omega$ holds, $z_j \in F$ holds, $y_m=(z_{\varepsilon m}, \ldots, z_{\varepsilon(m+1)-1})$ holds for m=0, ..., M−1, and $z_q$ by which q>L−1 is established among q=$\varepsilon$(M−1), ..., $\varepsilon$M−1 is 0, and
a third arithmetic unit that obtains a third concealed verification value $[r_m y_m]_i$ with secure computation by using the concealed extension field random number $[r_m]_i$ and the second concealed verification value $[y_m]_i$ and outputs the third concealed verification value $[r_m y_m]_i$, and
the verification device determines that authentication is successful when $r_m y_m = 0$ is satisfied for all of m=0, ..., M−1.

7. The secure computation authentication system according to claim 6, wherein
N pieces of the secure computation devices are provided,
N is an integer which is 3 or greater,
the concealed extension field random number $[r_m]_i$ is a secret sharing value conforming to a (2, N) Shamir's secret sharing scheme,
the second arithmetic unit obtains the second concealed verification value $[y_m]_i$ by joining members of a sequence representing the first concealed verification value $[z]_i$, the third arithmetic unit obtains the third concealed verification value $[r_m y_m]_i$ by using the second concealed verification value $[y_m]_i$ as a secret sharing value conforming to the (2, N) Shamir's secret sharing scheme, $r_m \in F^\varepsilon$, $_r s_m \in F^\varepsilon$, $_y s_m \in F^\varepsilon$, $_R s_m \in F^\varepsilon$, $I \in F^\varepsilon$, $[r_m]_i = r_m + _r s_m \cdot I \in F^\varepsilon$, $[y_m]_i = y_m + _y s_m \cdot I \in F^\varepsilon$, $[r_m y_m]_i = r_m \cdot y_m + (r_m \cdot _y s_m + _r s_m \cdot y_m) \cdot I + _r s_m \cdot _y s_m \cdot I^2 \in F^\varepsilon$, and $i=1, \ldots, N$ hold, each of the secure computation devices further includes
a second random number generation unit that obtains a second concealed extension field random number $[R_m]_i = R_m + _R s_m \cdot I \in F^\varepsilon$ which is a secret sharing value of a second extension field random number $R_m \in F^\varepsilon$, a fourth arithmetic unit that obtains an extension field multiplication value $[R_m]_i \cdot I = R_m \cdot I + _R s_m \cdot I^2 \in F^\varepsilon$, and a fifth arithmetic unit that obtains and outputs a fourth concealed verification value $[r_m y_m]_i + [R_m]_i \cdot I = r_m \cdot y_m + (r_m \cdot _y s_m + _r s_m \cdot y_m + R_m) \cdot I + (_r s_m \cdot _y s_m + _R s_m) \cdot I^2 \in F^\varepsilon$, and the verification device performs an operation with respect to $[r_m y_m]_{\varphi(1)} + [R_m]_{\varphi(1)} \cdot I$, $[r_m y_m]_{\varphi(2)} + [R_m]_{\varphi(2)} \cdot I$, and $[r_m y_m]_{\varphi(3)} + [R_m]_{\varphi(3)} \cdot I$ for $\{\varphi(1), \varphi(2), \varphi(3)\} \subseteq \{1, \ldots, N\}$ in accordance with a (3, N) Shamir's secret sharing scheme, and determines that authentication is successful when $r_m y_m = 0$ is satisfied for all of $m=0, \ldots, M-1$.

8. A secure computation method of a secure computation device, in which

L is an integer which is 1 or greater, $\varepsilon$ is an integer which is 2 or greater, F is a finite field, $F^\varepsilon$ is an extension field of the finite field F, an extension degree of the extension field $F^\varepsilon$ is $\varepsilon$, ceil(x) is a minimum integer which is equal to or greater than a real number x, M=ceil(L/$\varepsilon$) holds, $j=0, \ldots, L-1$ holds, and $m=0, \ldots, M-1$ holds, the secure computation method comprising:
an input step in which an input unit receives input of concealed authentication information $[\omega]_i \in [F]^L$ which is a secret sharing value of authentication information $\omega$;

a first arithmetic step in which a first arithmetic unit obtains a first concealed verification value $[z]_i = [w-\omega]_i$ with secure computation by using the concealed authentication information $[w]_i \in [F]^L$, the concealed authentication information $[w]_i$ being a secret sharing value of authentication information w, and the concealed authentication information $[\omega]_i$;

a random number generation step in which a random number generation unit obtains a concealed extension field random number $[r_m]_i \in [F^\varepsilon]$ which is a secret sharing value of an extension field random number $r_m$;

a second arithmetic step in which a second arithmetic unit obtains a second concealed verification value $[y_m]_i$ in which $y_m$ is concealed with secure computation by using the first concealed verification value $[z]_i$, where $z = (z_0, \ldots, z_{L-1}) = w - \omega$ holds, $z_j \in F$ holds, $y_m = (z_{\varepsilon m}, \ldots, z_{\varepsilon(m+1)-1})$ holds for $m=0, \ldots, M-1$, and $z_q$ by which $q > L-1$ is established among $q = \varepsilon(M-1), \ldots, \varepsilon M-1$ is 0; and a third arithmetic step in which a third arithmetic unit obtains a third concealed verification value $[r_m y_m]_i$ with secure computation by using the concealed extension field random number $[r_m]_i$ and the second concealed verification value $[y_m]_i$.

9. A non-transitory computer readable medium that stores a program for making a computer function as the secure computation device according to claim 1.

\* \* \* \* \*